Patented Jan. 22, 1935

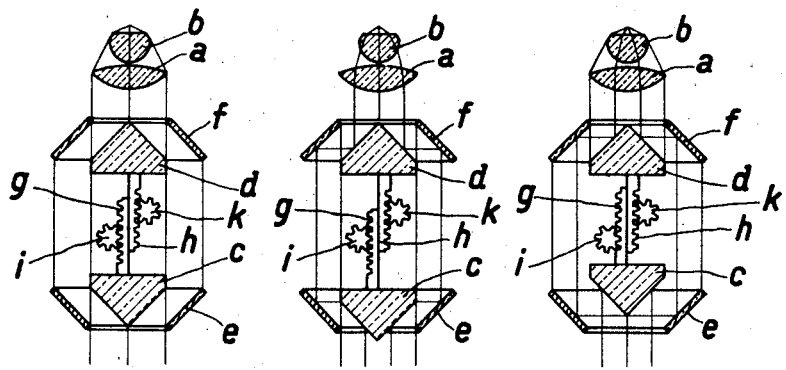
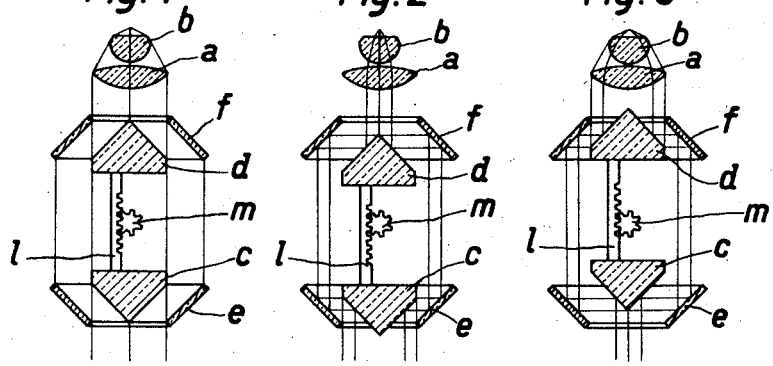
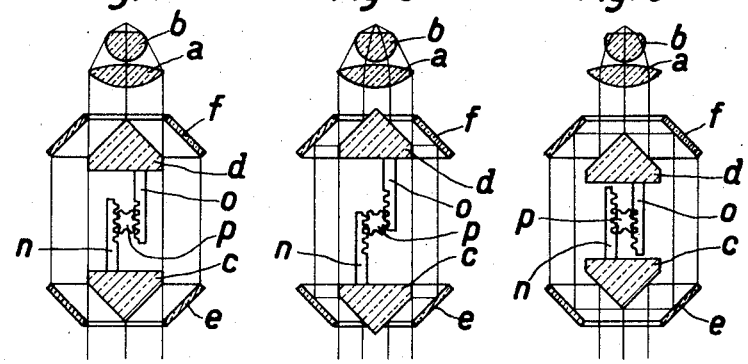

1,988,946

UNITED STATES PATENT OFFICE 1,988,946

DIAPHRAGM SYSTEM FOR MICROSCOPE CONDENSERS

Friedrich Hauser and Guido Reinert, Jena, Germany, assignors to the firm of Carl Zeiss, Jena, Germany Application May 31, 1933, Serial No. 673,648
In Germany June 4, 1932

3 Claims. (Cl. 88—39)

Application has been filed in Germany, June 4, 1932.

The restriction of the aperture of a pencil of illumination rays directed by means of a microscope condenser to a microscopic object is generally effected by an iris diaphragm, especially when there is to be restricted the aperture of a pencil of illumination rays directed to the microscope condenser as a pencil of parallel rays and converged by this condenser approximately in the focusing plane of the microscope. According to the type of condenser, a diaphragm of the said kind restricts either the exterior or the interior marginal rays of the illumination ray pencil. For instance, when using an iris diaphragm conjointly with one of the usual light-field condensers the exterior, and when applying an iris diaphragm in connexion with a paraboloid condenser the interior, marginal rays of the pencil are influenced. When illuminating with a condenser having an iris diaphragm, and when it is desired to restrict the aperture of those marginal rays which are not influenced by this iris diaphragm, use is to be made also of a central diaphragm disposed in the path of illumination rays.

The invention aims at stopping down in the simplest manner possible either kind of marginal rays and provides to this end a diaphragm system consisting of two co-axial and substantially equal reflecting systems each of which is composed of a male and a female cone and which are so disposed one behind the other in the path of illumination rays, in front of the condenser, as to be struck by the illumination rays in reverse senses. An aberration of the reflected rays which is caused by any conical surface is not to be feared, because the aberration arising at the one reflecting system is neutralized by the other. By suitably dimensioning and positioning the different members of the diaphragm system relatively to each other in axial direction, any desired restriction of the aperture may be obtained for the different microscope condensers. The diaphragm system may be used in illumination with transmitted as well as with incident light, it being understood that the invention is in no way restricted to microscopic use and may be applied as well for similar purposes.

Not only may alterations of the diaphragm effect be made by changing different members of the diaphragm system for similar members of other dimensions, but they can be achieved as well by making at least the members of one of the two reflecting systems displaceable relatively to each other in axial direction, it being especially expedient to provide that the two female cones are stationary and the two male cones, displaceable in axial direction. If, in this case, the two male cones are coupled to each other, the constructional form in which the two male cones are displaceable independently of each other is largely improved in so far as the diaphragm may be adjusted by means of one single member only. A specially convenient form of the diaphragm system is obtained when the two male cones are rigidly connected to each other so as to effect equal movements. In some cases, however, it may be appropriate to interconnect the two male cones in such a manner as to make a displacement of the one of these cones entail an equal displacement of the other in the opposite sense.

The accompanying drawing, which illustrates the invention, represents schematically three constructional forms of the diaphragm system in central sections. Each of the examples is shown with three different diaphragm adjustments, Figures 1 to 3, 4 to 6, and 7 to 9 corresponding to the first, the second, and the third constructional example, respectively.

All three examples have a two-lens condenser $a, b$ illuminating microscopic objects with transmitted light and struck by a pencil of parallel illumination rays. In the path of illumination rays, and in front of this condenser $a, b$, are disposed two reflecting systems which consist of a male-cone reflector $c$ and a female-cone reflector $e$, and of a male-cone reflector $d$ and a female-cone reflector $f$, respectively. The female-cone reflectors $e$ and $f$ are stationary, and the male-cone reflectors $c$ and $d$ are displaceable in the direction of the axis of the pencil of illumination rays. In the sense of the direction of light, the apices of the conical surfaces of the reflectors $c$ and $e$ lie before and those of the conical surfaces of the reflectors $d$ and $f$, behind the reflectors. The diameters of the meridional sections of the reflecting surfaces are equal in all three examples.

In the first example (Figures 1 to 3), the male-cone reflector $c$ has a rack $g$ and the male-cone reflector $d$, a rack $h$. The racks $g$ and $h$ are in mesh with small pinions $i$ and $k$, respectively.

By turning the pinions $i$ and $k$, the male-cone reflectors $c$ and $d$ may be displaced independently of each other in axial direction, relatively to the appertaining female-cone reflectors $e$ and $f$, these displacements altering the stopping-down effects of the entire diaphragm system consisting of the reflectors $c, d, e, f$. When the male-cone reflectors $c$ and $d$ assume the positions represented in Figure 1 of the drawing, the entire cross-sectional area of the pencil of illumination rays traversing the condenser $a, b$ is effective. In Figure 2, the male-cone reflector $c$ is represented in a position it has been given by displacement in a direction reverse to that of the light, the male-cone reflector $d$ having remained in its original position. When the reflectors assume the said positions, the central part of the pencil of illumination rays is stopped down. As is obvious from the drawing, this loss of light entails a restriction of the exterior marginal rays of the pencil traversing the condenser $a, b$. Contrary thereto, if the male-cone reflector $c$ is displaced in the sense of the direction of light, as is represented in Figure 3, the incident pencil of illumination rays is restricted at its periphery, and what is stopped down is the central part of the pencil of illumination rays traversing the condenser $a, b$. Figure 3 gives a clear idea as to the fact that, apart from the said apertural restrictions, the displacement of the male-cone reflector $d$ for instance in the sense of the direction of light would entail with the illumination according to Figure 2 a stopping-down of the central illumination rays traversing the condenser $a, b$, and with Figure 3 a stopping-down of the exterior of these rays. In other words, the constructional form according to the first example makes it possible to change the aperture of the pencil of illumination rays simultaneously with respect to the exterior and with respect to the interior marginal rays.

In the second constructional form (Figures 4 to 6), the two male-cone reflectors $c$ and $d$ are interconnected by a rack $l$ meshing with a small pinion $m$. By turning this pinion $m$, the male-cone reflectors $c$ and $d$ may be axially and conjointly displaced relatively to the female-cone reflectors $e$ and $f$. Figures 5 and 6 show that a displacement in a sense contrary to that of the light entails a stopping-down of the exterior marginal rays of the entire pencil of illumination rays which traverses the condenser $a, b$ and is represented in Figure 4, and that a displacement in the sense of the direction of light causes the central part of this illumination ray pencil to be stopped down.

In the third example (Figures 7 to 9), the two male-cone reflectors $c$ and $d$ may be displaced in opposite senses. For this reason, the said reflectors have racks $n$ and $o$, respectively, which mesh with one and the same pinion $p$. Whereas Figure 7 represents the positions of the different reflecting surfaces relative to each other, in which the entire incident pencil of illumination rays is effective, Figure 8 shows that an increase of the distance apart of the male-cone reflectors $c$ and $d$ entails a stopping-down of the central part of the pencil of illumination rays traversing the condenser $a, b$. Figure 9, however, shows that the consequence of reducing the said distance is an apertural restriction with respect to the exterior marginal rays of the pencil traversing the condenser $a, b$.

We claim:

1. In a diaphragm system for microscope condensers, two reflecting systems, each of these reflecting systems consisting of a male-cone and a female-cone reflector, all four cones being co-axial, the said two reflecting systems lying opposite each other, and means for axially displacing the two male cones, the said two male cones being coupled to each other for simultaneous displacement.

2. In a diaphragm system according to claim 1, the two male cones being rigidly connected to each other.

3. In a diaphragm system according to claim 1, means for axially displacing the two male cones by equal amounts and in reverse senses.

FRIEDRICH HAUSER.
GUIDO REINERT.